(12) United States Patent
Hsu

(10) Patent No.: US 6,988,812 B2
(45) Date of Patent: Jan. 24, 2006

(54) LIGHTING APPARATUS

(75) Inventor: Shih-Lung Hsu, Taoyuan (TW)

(73) Assignee: BenQ Corporation, Taoyuan (TW)

( * ) Notice: Subject to any disclaimer, the term of this patent is extended or adjusted under 35 U.S.C. 154(b) by 82 days.

(21) Appl. No.: 10/687,201

(22) Filed: Oct. 16, 2003

(65) Prior Publication Data

US 2004/0228103 A1    Nov. 18, 2004

(30) Foreign Application Priority Data

Oct. 23, 2002    (TW) .............................. 91216946 U

(51) Int. Cl.
    *G01D 11/28*    (2006.01)
(52) U.S. Cl. ....................................................... 362/23
(58) Field of Classification Search .................. 362/23,
         362/27–31, 311, 30, 25, 555, 24, 26; 324/414;
                                                   116/202, 288
    See application file for complete search history.

(56) References Cited

U.S. PATENT DOCUMENTS

| | | | | |
|---|---|---|---|---|
| 2,520,028 A | * | 8/1950 | Biskind ....................... | 116/202 |
| 2,831,453 A | * | 4/1958 | Hardesty .................... | 116/288 |
| 2,909,724 A | * | 10/1959 | Mead et al. ................ | 324/414 |
| 4,445,164 A | * | 4/1984 | Giles et al. ................. | 362/311 |
| 5,075,824 A | * | 12/1991 | Tan ............................. | 362/31 |
| 6,508,562 B1 | * | 1/2003 | Venkatram et al. ........... | 362/23 |
| 2003/0095398 A1 | * | 5/2003 | Parker et al. ................. | 362/29 |

* cited by examiner

*Primary Examiner*—Thomas M. Sember
*Assistant Examiner*—James W Cranson, Jr.
(74) *Attorney, Agent, or Firm*—Thomas, Kayden, Horstemeyer & Risle

(57) ABSTRACT

A lighting apparatus. The lighting apparatus comprises a light source, a hollow hollow module, and a rectangular lens. The hollow module has a concave, a opening, and an inner reflective surface. The light source is disposed in the concave. The rectangular lens with a semi-translucent incident surface and a display surface is seated in the opening. Light rays emitted from the light source are reflected by the inner surface. Subsequently, the light rays enter the incident surface and exit the lens through the display surface.

9 Claims, 4 Drawing Sheets

LIGHTING APPARATUS

BACKGROUND OF THE INVENTION

1. Field of the Invention

The present invention relates to a lighting apparatus, and in particular to a lighting apparatus that provides uniform illumination to an indicator for an electronic device.

2. Description of the Related Art

In a variety of consumer electronic devices, the application of LED (Light-Emitting Diode) has become more and more important. With efficacies greater than traditional lamps, along with their durability, small size, light weight and low cost, LEDs have found their way into many applications within the lighting community. Since LEDs have such good performance and low cost, they have also been applied into many fields, for example the automobile industry and instrumentation, in recent years.

Generally, LEDs can be used as indicator lights for an electronic device. For example, the conventional indicator of the LCD-TV (liquid crystal display TV) uses a single or multiple LEDs emitting light through a lens disposed on the front bezel of the LCD-TV. Thereby, users are enabled by the indicator lights to operate the LCD-TV.

While a large area display surface is needed for the indicator, the lens of the indicator can be many shapes. However, using only a single LED light source cannot make uniform illumination due to the distance variation between the LED and the lens.

To address the disadvantage mentioned above, the conventional LED indicator usually uses several LEDs or an EL (Electro-Luminescent) lamp to overcome the non-uniform illumination. However, it is inevitably expensive and complex

SUMMARY OF THE INVENTION

An object of the invention is to provide a lighting apparatus that provides uniform illumination to an indicator for an electronic device.

The lighting apparatus comprises a light source, a hollow module, and a lens. The hollow module has a concave, a opening, and an inner reflective surface. The light source, for example a LED, disposed in the concave of the hollow module. The lens, with L-shaped cross-section has a semi-translucent incident surface and a display surface. The lens is seated in the opening of the hollow module, wherein the semi-translucent incident surface is forward to the inner reflective surface of the hollow module and the display surface is located on the electronic device.

Light rays emitted from the light source are reflected by the inner surface of the hollow module. Subsequently, the light rays enter the incident surface and exit the lens uniformly through the display surface.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
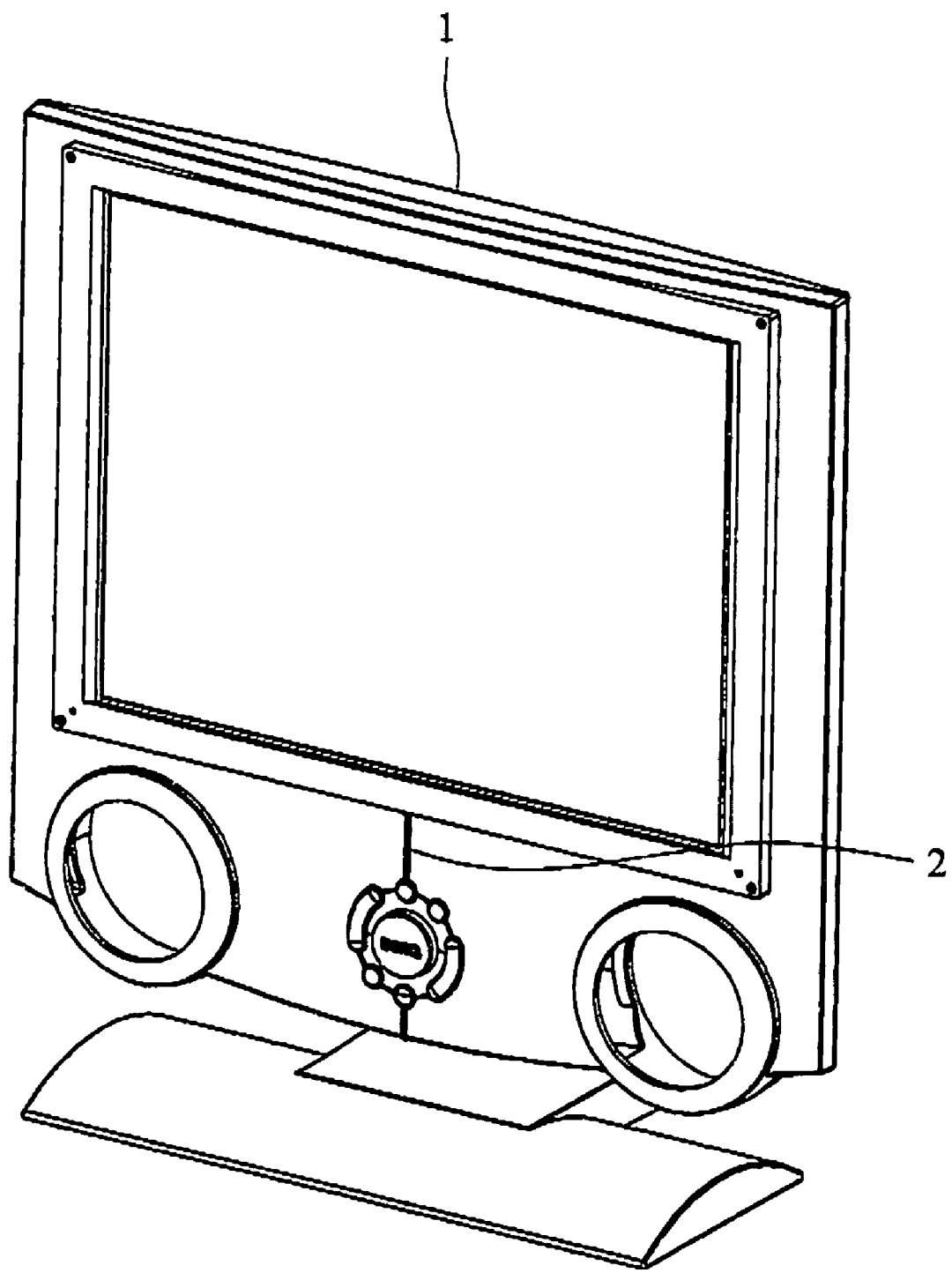
FIG. 1 is a perspective diagram of a LCD-TV utilizing the lighting apparatus of the present invention as an indicator light.

Referring to FIG. 1, a rectangular indicator 2 is disposed in a LCD-TV 1. Users are abled to operate the LCD-TV 1 by the light of indicator 2. Particularly, the lighting apparatus of the present invention is disposed herein as the indicator 2 shown in FIG. 1.

Figure 2:
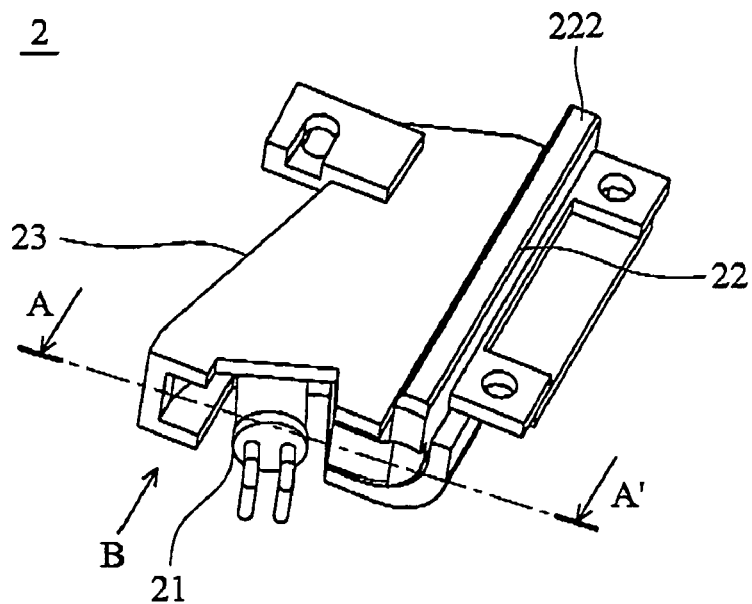
FIG. 2 is a perspective diagram of the lighting apparatus in accordance with the present invention.
Figure 3:
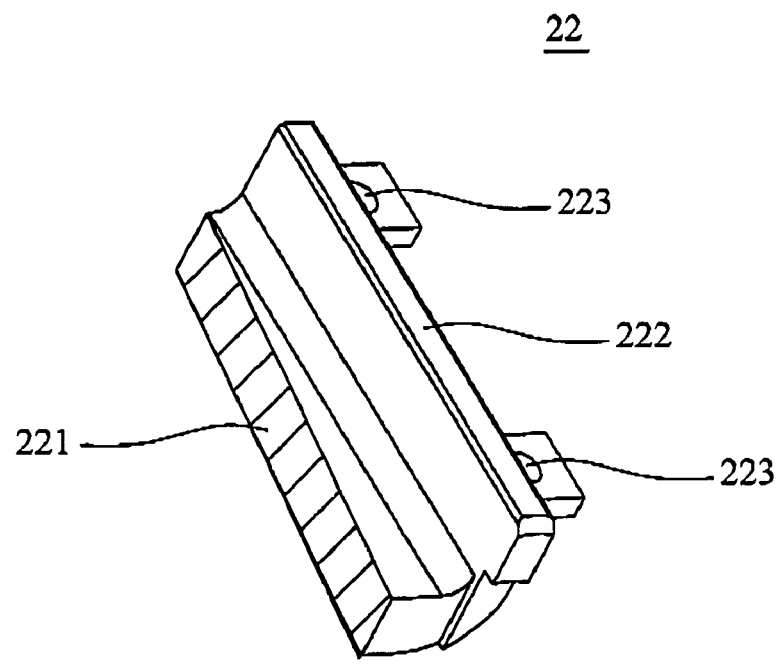
FIG. 3 is a perspective diagram of a lens in accordance with the present invention.

Referring to FIG. 2, the lighting apparatus of the present invention comprises a LED 21, a rectangular lens 22 and a hollow module 23. As shown in FIG. 3, the lens 22 is rectangular with a rectangular display surface 222. The lens 22 is plastic pervious to light.

The lens 22 has an incident surface 221, and two screw holes 223, joining the hollow module 23 thereto, wherein the incident surface 221 is located inside the hollow module 23.

Light rays emitted from the LED 1 reach the incident surface 221, and pass through the lens 22, exiting via the display surface 222. Particularly, the LED 1 and the lens 22 are colored for easier user identification.

Figure 4A:
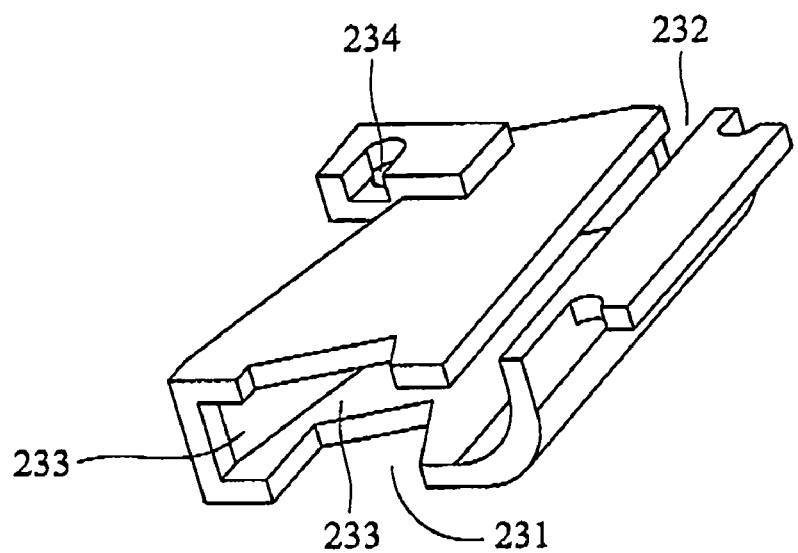
FIG. 4A, 4B is a perspective diagram of a hollow module in accordance with the present invention.
Figure 4B:
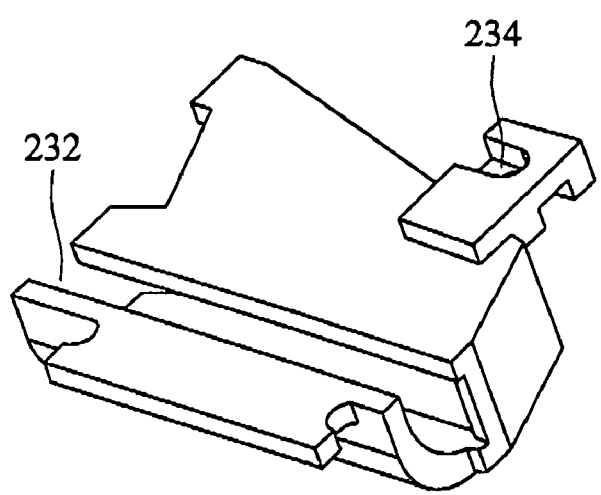

As shown in FIG. 4A and FIG. 4B, the hollow module 23 has a concave 231, a opening 232 and a screw hole 234. The size of the concave 231 is approximately equal to the LED 21 so that the LED 21 is easily seated therein. Moreover, the inner surface 233 within the hollow module 23 is processed and able to reflect light. Thus, light rays emitted from the LED 1 are reflected by the inner surface 233 and incident into the incident surface 221 of the lens 22.

In FIG. 4B, the opening 232 is also rectangular, corresponding to the lens 22 to allow positive seating therein when inserting the lens 22 into the opening 232. Furthermore, the hollow module 23 is connected to the LCD-TV 1 by screwing through the screw hole 234.

Figure 5:
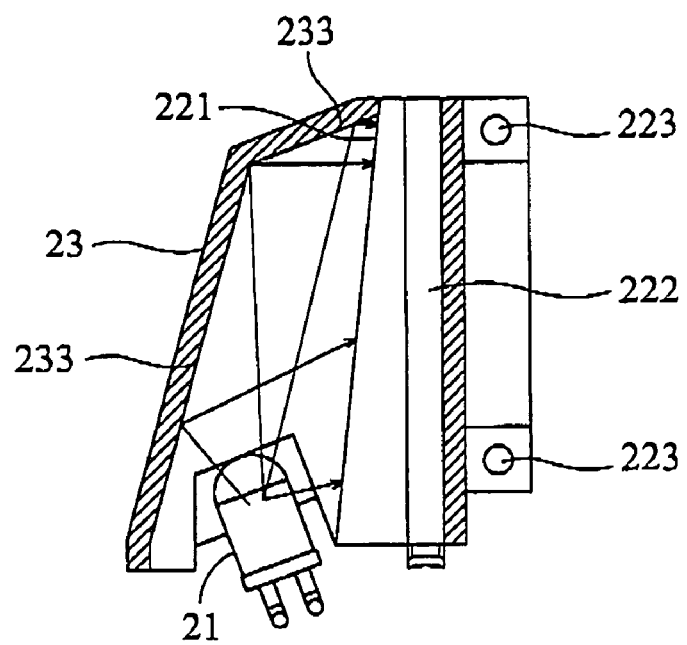
FIG. 5 is a schematic A—A cross-section as shown in FIG. 2 in accordance with the present invention.

Referring to FIG. 5, the arrows indicate the directions of light rays emitted from the LED 1. As shown in FIG. 5, light rays are reflected inside the hollow module 23. Subsequently, the light rays enter the lens 22 through the incident surface 221. As light rays are reflected by the inner surface 233, the light is uniformly guided into the incident surface 221 without dissipation.

In order to perform uniform illumination, the incident surface 221 is processed to be semi-translucent so that the incident light can be diffused and equalized.

Figure 6:
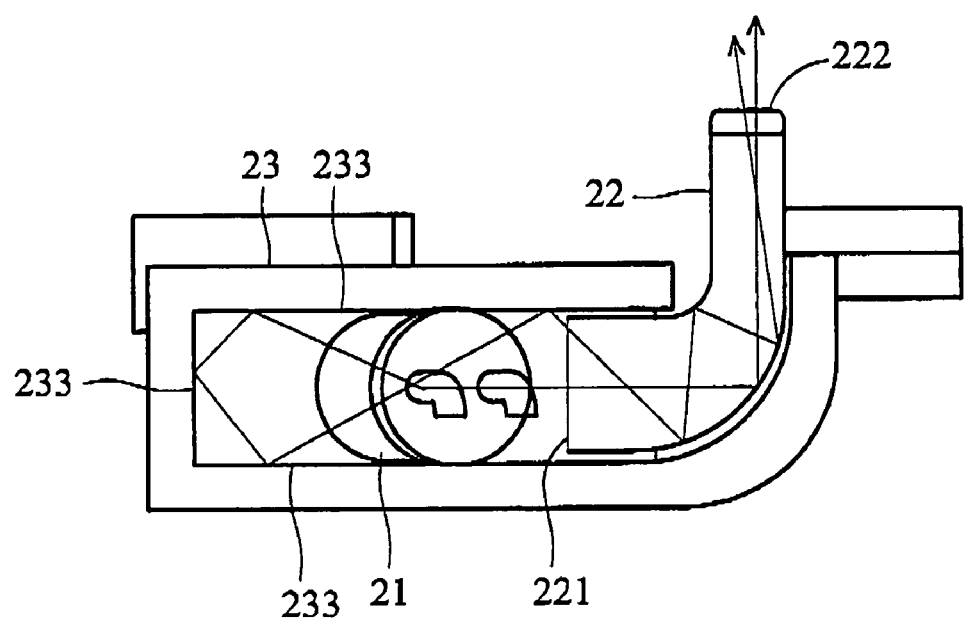
FIG. 6 is a lateral view in direction B as shown in FIG. 2 in accordance with the present invention.

Referring to FIG. 6, the arrows indicate the direction of light rays emitted from the LED 1. As shown in FIG. 6, the cross-section of the lens 22 is L-shaped. Since the light rays emitted from the LED 21 are reflected few times by the inner surface 233 inside the hollow module 23, the light can be guided into the incident surface 221 and exit through the display surface 222 uniformly.

Thus, the present invention provides a lighting apparatus to an indicator which provides uniform illumination. The light emitted from the LED 21 can be guided into the incident surface 221 uniformly by reflection. Moreover, the emitted light rays are limited inside the hollow module 23 without dissipation. It is economical and efficient that the lighting apparatus of the present invention uses a only single LED as the light source to perform uniform illumination of a rectangular indicator.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lighting apparatus for a LCD-TV, comprising:
   a hollow module having an inner reflective surface and an opening;
   a light source disposed in the hollow module;
   a lens disposed in the opening, having an incident surface and a display surface, the incident surface faced inside the hollow module, the lens located on the LCD-TV;
   wherein light rays emitted from the light source are reflected by the inner surface and transmitted into the incident surface then exit the lens through the display surface.

2. The lighting apparatus as claimed in claim 1, wherein the light source is a LED.

3. The lighting apparatus as claimed in claim 1, wherein the incident surface has a semi-translucent surface.

4. The lighting apparatus as claimed in claim 1, wherein the cross-section of the lens is L-shaped.

5. The lighting apparatus as claimed in claim 1, wherein the hollow module includes a concave where the light source disposed.

6. The lighting apparatus as claimed in claim 1, wherein the lens defines a screw hole so that the lens and the hollow module connected by screwing.

7. The lighting apparatus as claimed in claim 1, wherein the hollow module defines a screw hole so that the hollow module and the LCD-TV are joined by screwing.

8. The lighting apparatus as claimed in claim 1, wherein the lighting apparatus is an indicator.

9. The lighting apparatus as claimed in claim 1, wherein the lens is rectangular.

* * * * *